Sept. 9, 1969 S. CLAUSS ETAL 3,466,658

RECORDING DRUM ARRANGEMENT

Filed Jan. 12, 1968

INVENTORS:
Siegbert CLAUSS
Kurt HURST
Alfred ORTLIEB

By Michael S. Striker their ATTORNEY

United States Patent Office 3,466,658
Patented Sept. 9, 1969

3,466,658

RECORDING DRUM ARRANGEMENT

Siegbert Clauss, Esslingen, Kurt Hurst, Stuttgart-Feuerbach, and Alfred Ortlieb, Stuttgart-Vaihingen, Germany, assignors to Robert Bosch G.m.b.H., Stuttgart, Germany Filed Jan. 12, 1968, Ser. No. 697,435
Claims priority, application Germany, Jan. 20, 1967, B 90,806
Int. Cl. G01d *15/24, 15/26, 15/34*
U.S. Cl. 346—138 10 Claims

ABSTRACT OF THE DISCLOSURE

An arrangement in which the recording medium mounted upon the surface of a recording drum, is fed from the interior of the drum. The recording medium is wound upon a roll and supported by a sleeve within the drum. The sleeve is rotatably mounted, in turn, upon a spindle passing through the axis of the drum. The drum has a slot running along the surface of the drum and parallel to the axis thereof. The recording medium may be unwound from the roll within the drum and passed through the slot so as to become tightly wound upon the surface of the drum. A clamping arrangement situated in proximity to the slot clamps the end of the recording medium firmly in place. A braking device within the interior of the drum prevents undesirable rotation of the roll of recording medium. Permanent magnetic elements are used to hold the clamping arrangement firmly in place and pressing against the end of the recording means stretched about the surface of the drum.

Background of the invention

In conventional facsimile apparatus, the recording medium is used in the form of a pre-cut sheet having precisely the desired dimensions. This recording sheet is then clamped securely to the recording drum at both of its ends through means of a clamping arrangement. The pre-cut recording sheets must thereby be stored and be readily accessible for instant usage. The mounting and stretching of the loose sheets upon the drum is considerably time consuming and requires the exercise of a substantial amount of skill. Thus, the recording medium must be mounted so that when the apparatus is in operation, the recording medium does not become torn by the recording head.

In a number of facsimile processes, furthermore, particularly sensitive recording media are used. These may, for example, be in the form of wax foil or electrolytically treated foil having metal vaporized or deposited upon it. When storing or handling such recording media, prescribed conditions must be observed in order to prevent damage to them from mechanical origin or climatic influences. This applies particularly when the recording media are in the form of loose sheets, in which case the required conditions are difficult to observe.

Accordingly, it is an object of the present invention to provide a facsimile recorder having a recording medium and storage space therefor. The recording medium, in accordance with the present invention, may be easily removed or obtained from the storage area or space and mounted upon the recording drum.

In accordance with the present invention, the preceding object is achieved by providing a storage roll mounted within the interior of the drum and rotated therewith. The roll storing the recording medium is prevented from rotating in a haphazard or inadvertent manner. The recording medium can be unrolled from this storage roll and passed through an axial slot along the surface of the drum. The recording medium can be stretched about the outer surface of the drum and firmly secured at its end, along the slot of the recording drum.

The recording medium may be pulled through the slot of the drum when the latter is in a stationary position. At the same time, the roll upon which the recording medium is stored is slidingly slipped upon a mounting sleeve. Any possible loose unwinding of the recording medium upon its roll is inhibited through the application of a brake. A spring member is arranged between the mounting sleeve and the brake, so as to tightly stretch the recording medium about the surface of the drum.

Summary of the invention

A recording arrangement adapted particularly to facsimile apparatus. A recording drum is rotatably mounted on bearings which pass through the axis of the drum. The drum is in the form of a shell having provision for storing within its interior a roll of recording medium. This recording medium is mounted upon a roll which slidably fits over a sleeve supported on a spindle passing through the axis of the drum. In operation, the recording medium wound upon the roll within the interior of the drum, is passed through a slot which is at the surface of the drum and parallel to the axis thereof. The recording medium is stretched, after passing through the slot, tightly upon the surface of the drum and the end of the recording medium is clamped in place along the vicinity of the slot. The clamping action is performed by a clamping member which is held in place through permanent magnetic means. A braking arrangement is provided for preventing the roll of wound recording medium to rotate unintentionally. The mounting of the recording medium upon the surface of the drum, is such that it cannot be torn by the recording head which is in immediate proximity with the recording medium.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

Description of the preferred embodiments

Figure 1:
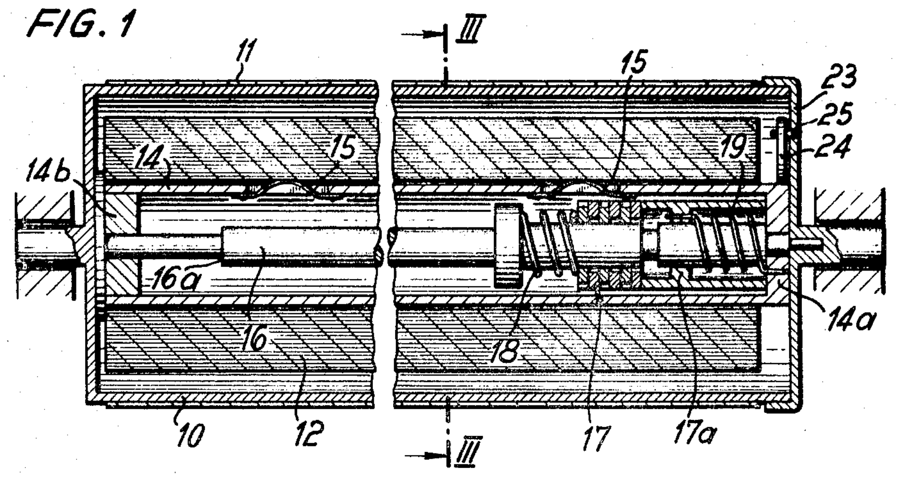
FIG. 1 is an elevational cross-sectional view of the recording drum, and shows the construction of the interior elements of the drum along the axis thereof.

The driven recording drum of a facsimile recorder is denoted by the reference numeral 10. The drum 10 carries a recording means 11 fed from a roll 12 situated within the interior of the drum 10. The recording material on the roll 12 is passed through the axial slit 13 and wrapped around the recording drum 10. The storage roll 12 is mounted upon a sleeve 14 where it is held in place through the use of two clamping springs 15. The mounting sleeve 14 is supported at its ends upon a spindle 16. Through a multiple-disc brake 17, the sleeve 14 is prevented from rotating inadvertently. The braking force is provided through the action of a spring 18. A torsion spring 19 is arranged between the brake 17 and the sleeve 14. One end of the torsion spring 19 is secured to the brake member 17*a*, whereas the other end of the torsion spring is secured to the frontal portion 14*a* of the sleeve 14. Along the slit or slot 13 and above the upper surface of the drum 10, a clamping member 20 is arranged. The loose or free end 11*a* of the recording means 11 passes underneath the clamping member 20. Permanent magnetic elements 21 are secured on the inner side of the recording drum 10, through means of the mounting plate 22. These permanent magnets act upon the clamp 20 and thus cause that the end 11*a* of the recording means 11 be firmly clamped to the recording drum 10.

Figures 2, 3:
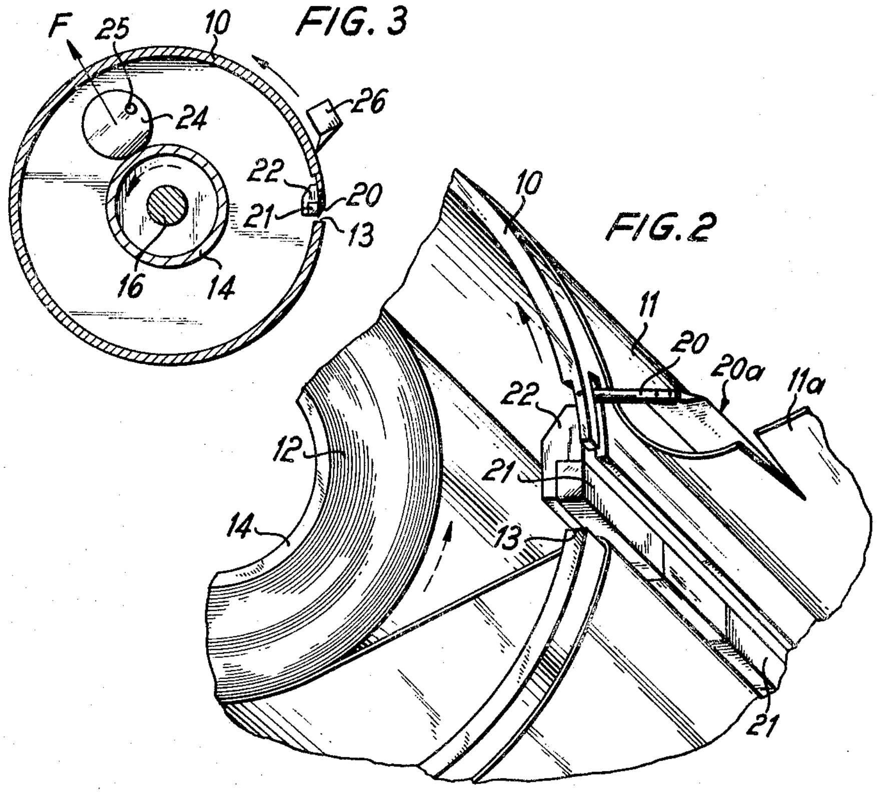
FIG. 2 is a partial isometric view of a section of the drum, and shows the axial slot and flange at the frontal portion of the drum, when magnified, in accordance with the present invention.
FIG. 3 is a cross-sectional end view of the recording drum taken along line III—III in FIG. 1, and shows the cross-sectional construction of the roll for storing the recording medium.

To insert the roll 14 into the drum 10, the flange 23 is first removed. This flange closes one end of the drum 10, as shown in FIG. 1. The sleeve 14 may then be pulled out of the drum 10 until its frontal portion 14*b* abuts the shoulder 16*a* of the spindle 16. The roll 12 is then slipped upon the sleeve 14, and the end of the recording means 11 is passed through the slot 13 of the drum 10. Afterwards, the flange 23 is again mounted in place to close the end of the drum. The recording means 11 can now be pulled out of the slot 13 in a very simple manner. When thus manually pulling upon the recording means 11, the mounting sleeve 14 rotates and stresses thereby the torsion spring 19. The torsion spring 19 is thus stressed to such extent that the force of the brake 17 is overcome and the recording means 11 is unwound from the roll 12 until the end 11*a* of the recording means 11 appears beneath the clamping member 20 which has been raised, as shown in FIG. 2. The clamping member 20 may then be lowered and clamped down so that the permanent magnet elements 21 hold the clamping members in place and firmly secure the end of the recording means upon the drum 10. The edge 20*a* of the clamping member 20 adjacent to the slot 13, is shaped to form an edge against which the recording means 11 may be torn off. Thus, the excess amount of recording means 11 passing beyond the clamping member 20 may be torn off through the aid of the edge 20*a*.

In order to prevent the return of the stressed torsion spring 19, when mounting the recording means 11 in place upon the surface of the drum, a clamping disc 24 is provided. This clamping disc is eccentrically mounted upon the pin or bearing 25, and thus blocks the return motion of the mounting sleeve 14. The stress or tension in the torsion spring 19, therefore, is rendered ineffective through the clamping disc 24, as shown in FIG. 3. When the recording drum 10 rotates in the direction of the indicating arrow, shown in FIG. 3, the clamping disc 24 rotates in the direction denoted by the arrow F, and thus does not exert a retarding force upon the sleeve 14. This results from the frictional force which, when exerted by the sleeve 14 upon the disc 24 tends to rotate the latter away from the surface of the sleeve 14. As a result, the recording means 11 becomes firmly stretched about the drum 10 as a result of the tension in the torsion spring 19. The apparatus is, accordingly, now ready for operation and the recording means may be written upon with a recording head 26.

When the recording operation or procedure is completed, the drum 10 is held stationary and the clamping member 20 is manually raised. The recording means 11 which has matter recorded upon it is removed from the drum 10 by being drawn from underneath the clamping member 20 which is in the raised position. Due to the action of the clamping disc 24, any return action or motion of the recording means 11 is inhibited. Upon removal of the recording means 11, the sleeve 14 with the roll 12 is rotated in the direction of the dotted arrow shown. The clamping disc 24 is thereby released simultaneously, and new recording material may be unrolled from the roll 12 and mounted upon the drum 10. If this procedure is thus carried out, the clamping member 20 is snapped back to its lowered position, and the completed recording or written portion is torn off at the edge 20*a*, so as to become separated from the new or fresh recording material. The apparatus can, therefore, be used now for a new cycle of operation.

The roll 12 containing the recording means 11 and situated within the drum 10, is substantially protected from damage due to mechanical effects and climate conditions. Recording means having a vaporized metallic layer which may be burned into, and which are not adapted to high-humidity environments, may be stored in this manner for a relatively long period of time. When the recording is made by electrically burning out the metallic layer through means of a recording electrode, the clamping member 20 serves as the ground or return path electrode. This is because the clamping member 20 is in electrical contact with the metallic layer of the recording means 11, when it is snapped in place in its lowered position.

It will be understood that each of the elements described above, or two or more together, may also find a useful application in other types of recording apparatus differing from the types described above.

While the invention has been illustrated and described as embodied in a recording apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A recording arrangement comprising, in combination, a recording drum mounted for rotation about an axis passing through the axial center thereof, said drum having an external surface provided with a slot parallel to said axis; recording means wound in the form of a roll in the interior of said drum, said recording means rotating with said drum and passing through said slot for winding upon said external surface; mounting sleeve means for mounting said roll in said drum, said roll being slidably mounted on said sleeve means; braking means comprising a multi-disc brake mounted within said sleeve means for inhibiting unintended motion of said roll of recording means in said drum; spring means mounted between said sleeve means and said braking means; and recording head means spaced from said external surface and said recording means wound upon said drum so as to record upon said recording means as desired.

2. The recording arrangement as defined in claim 1 further including spindle means for mounting said sleeve means within the interior of said drum, said spring means being secured to said spindle means and to said sleeve means, said spring means tending to rotate said sleeve means in the direction in which roll of recording means is unwound.

3. The recording arrangement as defined in claim 2 including clamping disc means acting against said sleeve means and preventing the rotation of said sleeve means in the direction opposite to that in which said roll of recording means is unwound, said recording means being tightly held against said recording drum by said spring means when said drum rotates and said clamping disc means is separated from said sleeve means by the centrifugal force acting upon said clamping disc means as a result of the rotation of said drum.

4. The recording arrangement as defined in claim 3 including flange means for sealing at least one end of said drum, said sleeve means being capable of projecting through said end of said drum when said flange is removed.

5. The recording arrangement as defined in claim 3 wherein said clamping disc means is a circular disc mounted eccentrically about an axis parallel to said axial center of said drum.

6. A recording arrangement comprising a hollow rotary recording drum having an opening extending in substantial parallelism with its axis; a roll of convoluted recording medium accommodated in said drum and having a portion extending outwardly through said opening; braking means operating between said roll and said drum so as to normally rotate said roll in response to rotation of said drum; and resilient means installed between said braking means and said drum to store energy in response to withdrawal of recording medium by way of said opening and in response to resulting rotation of said roll with reference to said drum.

7. A recording arrangement as defined in claim 6, wherein said drum is provided with an axially extending spindle in the interior thereof and further comprising a sleeve rotatably surrounding said spindle and surrounded by said roll so as to rotate therewith, said braking means being mounted on said spindle and being arranged to brake said roll by way of said sleeve, said resilient means comprising a torsion spring connecting a portion of said braking means with said sleeve.

8. A recording arrangement as defined in claim 6, wherein said drum has an external surface and further comprising clamping means carried by said drum and movable to and from a clamping position in which it urges said portion of said recording medium against said external surface.

9. A recording arrangement as defined in claim 8, further comprising magnet means mounted on said drum and arranged to normally hold said clamping means in clamping position.

10. A recording arrangement as defined in claim 8, wherein said clamping means is provided with a cutting edge to facilitate tearing of said recording medium.

References Cited

UNITED STATES PATENTS

| | | | |
|---|---|---|---|
| 2,170,505 | 8/1939 | Peters | 346—138 |
| 2,730,949 | 1/1956 | Mitchell | 101—415.1 |

JOSEPH W. HARTARY, Primary Examiner